Dec. 18, 1945.  L. S. SANDERSON  2,391,196
SELECTOR VALVE
Filed Sept. 25, 1944
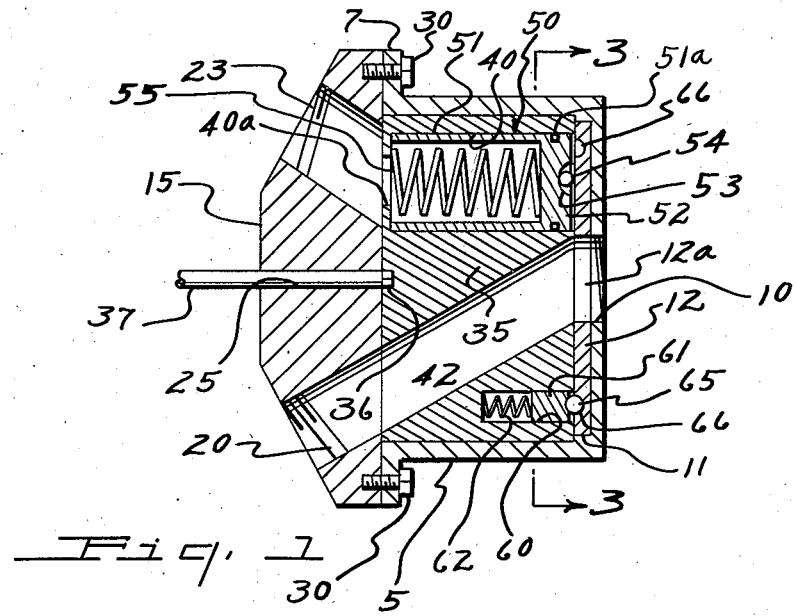
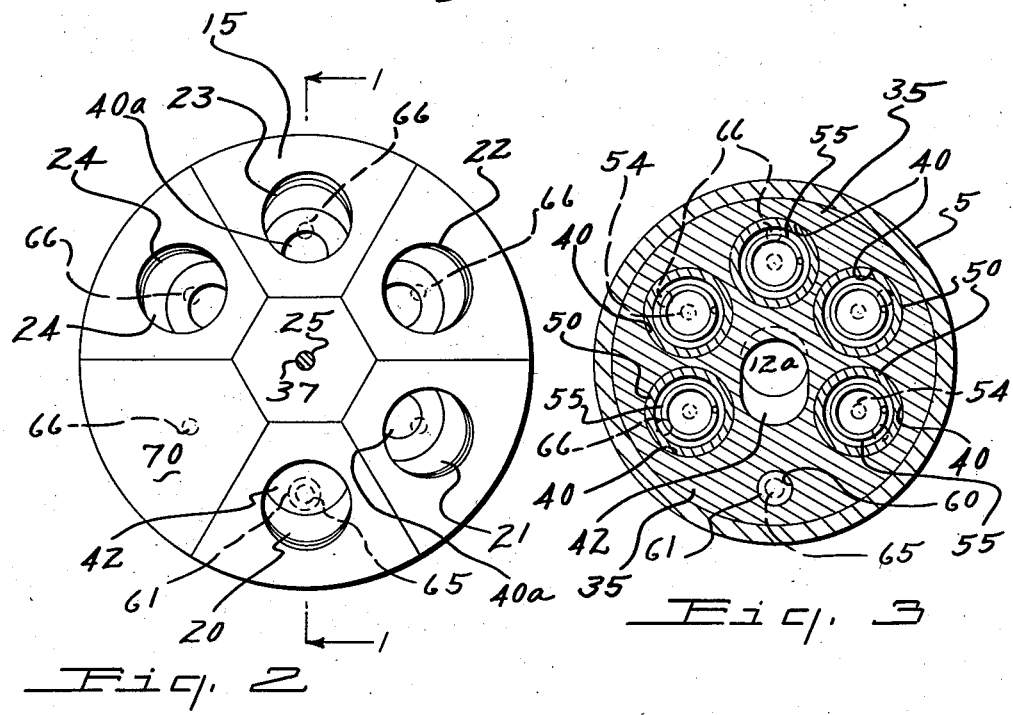
INVENTOR.
Lawrence S. Sanderson
BY
Atty.

Patented Dec. 18, 1945

2,391,196

UNITED STATES PATENT OFFICE 2,391,196

SELECTOR VALVE

Lawrence S. Sanderson, Los Angeles, Calif.

Application September 25, 1944, Serial No. 555,636

8 Claims. (Cl. 251—85)

This invention has to do with selector valves for connecting any one of a plurality of inlets to a single outlet, or vice versa. In its present preferred embodiment it is adapted primarily for use in airplanes and the like where a single gas feed line must be selectively connected to any one of a number of separate gasoline tanks.

One of the difficulties experienced in prior art valves used for this purpose has been that pressure in the inlet lines which are not in communication with the outlet tends to break the seal between the various valve elements and results in leakage. There has also been a tendency in other valves to seize or freeze in position due to swelling of the sealing element used.

It is therefore a primary purpose of my invention to provide a selector valve which embodies means for so handling the pressure in the inlet lines not currently in communication with the outlet, that such pressure does not tend to separate or break the seal between the elements of the valve.

Another object of the invention is to provide a simple, economical, durable and efficient valve which provides uniform performance and which will not leak.

Other advantages and novel features of the invention will become apparent from the following explanation wherein I describe a presently preferred structure incorporating the invention and for which purpose I shall refer to the accompanying drawing, in which:

Fig. 1 is a section taken on line 1—1 of Fig. 2;

Fig. 2 is an end elevation; and

Fig. 3 is a section taken on line 3—3 of Fig. 1.

Referring now to the drawing I show an embodiment of my valve having a body comprising a cylindrical side wall 5, an end wall 6 and an annular peripheral flange 7. The end wall has a port 10 into which any desired adapter, nipple or other connection element, not shown, may be mounted, the port being machined to suit for such purpose.

To provide a suitable bearing surface, the inner face of the end wall 6 has a circular recess 11 into which fits a suitably hardened plate 12 having a central opening 12a registering with port 10.

A front cover plate 15 having five circumferentially spaced diagonal ports 20, 21, 22, 23, 24 and an axial opening 25 is secured to the body flange 7 by means of cap screws 30. Each of the ports 20-24 is machined to receive a suitable hose connection, not shown.

A core member 35 of rounded cross section is rotatably disposed in the body, having a central recess 36 of squared cross section in its front surface to receive the squared inner end of an operating pin 37, which pin rotatably passes through opening 25 in the cap. It is by means of pin 37 that the core member is manually rotated relative to the body and cap.

The core has five circumferentially spaced longitudinal bores 40 each of which has a reduced diameter front end portion 40a. The core also has a diagonal port 42 which, at its front end, is adapted to selectively register with either of the ports 20—24 and, at its rear or discharge end, registers with port 10.

Within each of the bores 40 there is a plunger 50, each of the plungers having a cylindrical side wall 51 provided with seal ring means 51a, and an end wall 52. Centrally of the exterior face of the end wall of the plunger there is a recess 53 loosely carrying a ball or roller 54 which bears against plate 12. A coil spring 55 is mounted in each plunger, bearing at one end against the end wall 52 and bearing at its other end against the shoulder provided by the reduced diameter bore portion 40a, so that the spring resiliently urges the plunger to the right and against the plate 12. Thus any pressure in the hose line communicating with those of the ports 20-24 which are not in communication with port 42 will be exerted directly against the end wall of the body instead of against any portion of the core, so that there is no tendency whatsoever for the core member to become cocked in the body to tend to break the seal.

There is a transverse bore 60 in the core within which is mounted a plunger 61 loaded by a spring 62. The plunger resiliently urges the detent ball 65 into any selected one of a plurality of ball-receiving recesses 66, which recesses are spaced apart circumferentially of the plate 12 in position to maintain a selected port 42 in accurate registry with a selected one of the ports 20-24.

To operate the device, port 10 is connected by a suitable conduit, with, for instance, the gasoline feed line of an airplane engine, and suitable conduits leading respectively from five different gasoline tanks are connected into the respective ports 20-24. The cover cap is so designed that it may have six such ports arranged symmetrically, although in lieu of the sixth port the cover cap is left solid at 70 so as to provide a closure surface—that is, when the inner face of the cover cap portion 70 is in covering relationship to the inlet end of port 42, the ports 20-24 are in registry with the respective plungers carried in the bores 40, so that no fluid may pass through the valve.

With the ports in the relative positions shown in the drawing, port 20 is in communication with ports 42, 12a and 10, while ports 21-24 are each in communication with one of the plungers 50, thus closing off the delivery of gas through ports 20-24. If it be desired to place port 21 in communication with ports 42, etc., the core member is rotated by means of the pin 37 until the detent 65 drops into the appropriate recess 66. Such operation may be continued until all five tanks connected with the ports 20-24 have been exhausted of fuel, or the valve may be completely closed at any time by rotating the core member until port 42 is in registry with the solid portion 70 of the cap.

The significance of the described construction may be understood when it is considered that if, for instance, the pressure in the inlet line connected with port 23 were applied to the front or left-hand face of the core member while the diametrically opposite port 20 is in communication with port 42, the pressure communicated through port 23 would urge the upper part of the core against the end wall of the body and tend to loosen the sealing engagement of the lower portion of the core with the lower portion of the body, which would be apt to result in leakage in the outlet line comprised of ports 20, 42, 12a and 10. I eliminate this danger by providing the described construction wherein the pressure in the lines which are currently closed off from communication with the valve outlet is imposed upon the end wall of the body.

I claim:

1. A selector valve comprising a cylindrical body having an end wall presenting a port, a cover cap secured on the body and presenting a plurality of ports each adapted to be connected to a source of fluid under pressure, a core member mounted for rotation in and coaxial with the body, a passageway through the core member adapted upon rotation of the core member relative to the body to register at one end with the port in the body end wall and to register at its other end with any selected one of the ports in the cap, and pressure-transmitting means in the core member operative to free the core member of fluid pressure transmitted through the ports in the cap which are not in communication with said passageway.

2. A selector valve comprising a cylindrical body having an end wall presenting a port, a cover cap secured on the body and presenting a plurality of ports each adapted to be connected to a source of fluid under pressure, a core member mounted for rotation in and coaxial with the body, a passageway through the core member adapted upon rotation of the core member relative to the body to register at one end with the port in the body and wall and to register at its other end with any selected one of the ports in the cap, said core member presenting a plurality of circumferentially spaced longitudinal bores adapted to communicate at their inlet ends with those of the respective ports in the cap which are not in communication with said passageway, and a plunger reciprocally mounted in each of said bores, the end wall of each of the plungers being adapted to bear against the body end wall in response to pressure transmitted thereto through said ports in the cap.

3. A selector valve comprising a cylindrical body having an end wall presenting an axial discharge port, a cover cap secured on the body and presenting a plurality of inlet ports each adapted to be connected to a source of fluid under pressure, said inlet ports being disposed through the cap in a direction convergent towards the axis of the cap, a core member of circular cross section rotatably nesting within the body between the cap and the body end wall, means for rotating the core member relative to the body and cap, a fluid passageway extending diagonally longitudinally through the core member in position to constantly register at its discharge end with the discharge port and to be selectively registerable at its inlet end with the inlet ports in response to rotation of the core member, said core member presenting a plurality of longitudinal bores extending therethrough and spaced apart circumferentially thereof, said respective bores being communicable selectively with the inlet ports upon rotation of the core member, and a plunger reciprocally mounted in each of the bores, the rear faces of the plungers being bearable against the body and wall in response to fluid pressure applied to their opposite faces through the inlet ports with which they are in communication.

4. A selector valve comprising a cylindrical body having an end wall presenting a discharge port therethrough, a cover cap secured on the body and having a pair of inlet ports therethrough, a core member rotatably nesting in the body between the cap and body end wall, means for rotating the core member relative to the body and cap, said core member presenting therethrough a fluid passageway registering at its outlet end with the discharge port and selectively registerable at its inlet end with the inlet ports, a longitudinal bore through the core member, said bore being positioned to selectively register at its inlet end with the inlet ports, and a plunger reciprocally mounted in the bore.

5. A selector valve comprising a cylinder body having an end wall presenting an axial discharge port, a cover cap secured on the body and having a pair of inlet ports therethrough so disposed that their outlet ends are convergent towards the axis of the body, a core member mounted in the body for rotative movement coaxial therewith, said core member presenting a diagonal longitudinal port constantly registering at its outlet end with a discharge port and selectively registerable at its inlet end with the inlet ports, a longitudinal bore through the core member, said bore being positioned to selectively register at its inlet end with the inlet ports, and a plunger reciprocally mounted in the bore.

6. A selector valve comprising a cylinder body having an end wall presenting an axial discharge port, a cover cap secured on the body and having a pair of inlet ports therethrough so disposed that their outlet ends are convergent towards the axis of the body, a core member mounted in the body for rotative movement coaxial therewith, said core member presenting a diagonal longitudinal port constantly registering at its outlet end with a discharge port and selectively registerable at its inlet end with the inlet ports, a longitudinal bore through the core member, said bore being positioned to selectively register at its inlet end with the inlet ports, a plunger reciprocally mounted in the bore, and spring means resiliently urging the plunger against the body end wall.

7. A selector valve comprising a cylinder body having an end wall presenting an axial discharge port, a cover cap secured on the body and having a pair of inlet ports therethrough so disposed that their outlet ends are convergent towards the axis of the body, a core member mounted in the body for rotative movement coaxial therewith, said core member presenting a diagonal longitudinal port constantly registering at its outlet end with a discharge port and selectively registerable at its inlet end with the inlet ports, a longitudinal bore through the core member, said bore being positioned to selectively register at its inlet end with the inlet ports, a plunger reciprocally mounted in the bore, and resilient detent means for yieldably retaining the core member in selected positions relative to the body and end cap.

8. A selector valve comprising a cylinder body having an end wall presenting an axial discharge port, a cover cap secured on the body and having a pair of inlet ports therethrough so disposed that their outlet ends are convergent towards the axis of the body, a core member mounted in the body for rotative movement coaxial therewith, said core member presenting a diagonal longitudinal port constantly registering at its outlet end with a discharge port and selectively registerable at its inlet end with the inlet ports, a longitudinal bore through the core member, said bore being positioned to selectively register at its inlet end with the inlet ports, a plunger reciprocally mounted in the bore, and a rotatable bearing member interposed between the rear face of the plunger and the body end wall.

LAWRENCE S. SANDERSON.